(12) United States Patent
Vilaginès et al.

(10) Patent No.: US 7,931,735 B2
(45) Date of Patent: Apr. 26, 2011

(54) OXYCOMBUSTION METHOD ALLOWING CAPTURE OF ALL OF THE CARBON DIOXIDE PRODUCED

(75) Inventors: Régis Vilaginès, Millery (FR); Thorsten Burkhardt, Münich (DE); Jean Falcimaigne, Bois Colombes (FR); Paul Broutin, Chaponost (FR)

(73) Assignee: Institut Francais du Petrole, Cedex (FR)

( * ) Notice: Subject to any disclaimer, the term of this patent is extended or adjusted under 35 U.S.C. 154(b) by 259 days.

(21) Appl. No.: 12/089,248

(22) PCT Filed: Oct. 4, 2006

(86) PCT No.: PCT/FR2006/002294
§ 371 (c)(1),
(2), (4) Date: Nov. 20, 2008

(87) PCT Pub. No.: WO2007/039687
PCT Pub. Date: Apr. 12, 2007

(65) Prior Publication Data
US 2009/0075219 A1    Mar. 19, 2009

(30) Foreign Application Priority Data
Oct. 4, 2005    (FR) ..................... 05 10100

(51) Int. Cl.
*B01D 53/00* (2006.01)
(52) U.S. Cl. ............. 95/39; 166/266; 166/267; 166/302
(58) Field of Classification Search ...... 95/39; 166/266, 166/267, 302
See application file for complete search history.

(56) References Cited

U.S. PATENT DOCUMENTS

| 4,344,486 A * | 8/1982 | Parrish ..................... 166/272.1 |
| 5,732,571 A | 3/1998 | Maerz et al. |
| 6,505,567 B1 | 1/2003 | Anderson et al. |
| 6,505,683 B2 * | 1/2003 | Minkkinen et al. ........... 166/266 |
| 2003/0022324 A1 | 1/2003 | Wild |

FOREIGN PATENT DOCUMENTS

| FR | 2 665 224 | 1/1992 |
| FR | 2 748 532 | 11/1997 |
| FR | 2 788 815 | 7/2000 |
| FR | 2872 566 | 1/2006 |
| GB | 2 287 288 | 9/1995 |
| WO | WO 02/084177 A1 | 10/2002 |

\* cited by examiner

*Primary Examiner* — Robert A Hopkins
(74) *Attorney, Agent, or Firm* — Antonelli, Terry, Stout & Kraus, LLP.

(57) ABSTRACT

The invention relates to an oxycombustion method with capture of the $CO_2$ produced. Mixer M supplies chamber CC with a mixture of oxygen from unit O and of recycled fumes from storage drum SG. Chamber CC is supplied with oxidizer from mixer M and with fuel flowing in through line 8. All of the combustion fumes are sent to water condensation unit CT, then fed into storage drum SG. Part of the fumes containing all the $CO_2$ produced by combustion is compressed to about 60 bars, then cooled and partly liquefied to about 15° C. in liquefaction unit L1, and stored in drum SM. According to the invention, the partly liquefied $CO_2$ is compressed by means of a multiphase pump in order to be discharged through line 16 and stored in an underground reservoir.

17 Claims, 2 Drawing Sheets

OXYCOMBUSTION METHOD ALLOWING CAPTURE OF ALL OF THE CARBON DIOXIDE PRODUCED

FIELD OF THE INVENTION

The present invention relates to a method for producing energy from fossil fuel with capture of the carbon dioxide with a view to its sequestration.

The combustion of fossil oil, natural gas or coal resources produces in return carbon dioxide that accumulates then in the atmosphere. Now, carbon dioxide is the main "greenhouse effect" gas. It prevents the solar infrared radiation from escaping back into space, thus contributing to warming up the earth's surface in proportions that may be much more significant than what has been observed so far through geologic times.

Since it does not seem possible, in the foreseeable future, to do without fossil fuels for supplying economies, a large number of actions are considered or started to try to reduce the amounts of $CO_2$ released into the atmosphere or to decrease the effects thereof.

The goal of the present invention is to provide a combustion method allowing capture of the $CO_2$ in order to inject it into suitable geologic layers (ancient oil or gas deposits, sealed saline aquifers, coal mines, . . . ).

BACKGROUND OF THE INVENTION

Document FR-2,872,566 discloses a combustion method that notably allows to carry out total liquefaction of the carbon dioxide captured at ambient temperature. Total $CO_2$ liquefaction requires limitation of the proportion of inert compounds present in the $CO_2$ produced. In this method, the maximum $CO_2$ capture ratio essentially depends on the proportion of inert gases present in the combustion fumes. In order to best limit the amount of inert gas in the fumes so as not to penalize the $CO_2$ capture efficiency, this method must preferably work with a combustion chamber that is constantly maintained under slight overpressure in relation to the outside. It also preferably works with an oxygen production unit that can provide more than 98% pure oxygen.

The present invention provides an oxycombustion method with $CO_2$ capture wherein the proportion of inert compounds in the $CO_2$ is not restricting. According to the invention, it is not necessary to totally liquefy the $CO_2$ prior to its transportation: $CO_2$ transportation is performed after multiphase compression that allows to treat the $CO_2$ stream comprising a significant part of the inert compounds.

SUMMARY OF THE INVENTION

In general terms, the present invention relates to a combustion method with carbon dioxide capture wherein at least the following stages are carried out:
a) mixing an oxygen-rich stream with a carbon dioxide-rich stream so as to form a mixture,
b) burning a fuel with said mixture,
c) treating the combustion fumes to condense the water and carry along the sulfur compounds,
d) partly liquefying at least part of the treated fumes obtained in stage c), by compression to a pressure ranging between 40 and 70 bars absolute and by cooling to a temperature above 0° C., so as to obtain partly liquefied fumes containing at least 8% by volume of liquid, and
e) compressing by means of at least one multiphase pump the partly liquefied fumes obtained in stage d) so as to obtain a compressed stream.

According to the invention, part of the treated fumes obtained in stage c) can be used to be mixed with the oxygen-rich stream in stage a). In stage d), partial liquefaction of the treated fumes can be achieved by means of at least one fumes compression to a pressure ranging between 50 and 70 bars and by cooling of the compressed fumes to a temperature ranging between 0° C. and 40° C.

According to the invention, the following operations can also be carried out:
expanding part of the compressed stream obtained in stage e), then
recycling said stream part by adding said expanded stream part to the partly liquefied fumes obtained in stage c), prior to compression by means of the multiphase pump.

Furthermore, said compressed stream part can be cooled by heat exchange prior to expansion.

According to the invention, the compressed fumes can be injected into an underground reservoir. The compressed fumes obtained in stage e) can be transported to, then injected and sequestered in an underground reservoir. Alternatively, the compressed fumes obtained in stage e) can be transported to, then injected into an underground hydrocarbon reservoir in order to improve hydrocarbon recovery.

The multiphase pump can be a helical-axial rotodynamic pump comprising at least one compression cell mounted on a single shaft and whose geometry is suited for pumping mixtures of a gas phase and of at least one liquid phase. More precisely, the multiphase pump can comprise at least one compression cell suited for pumping mixtures of a gas phase and of at least one liquid phase, associated with at least one compression cell conventionally used for pumping or compression of fluids made up of a single phase.

The main advantage of the method according to the invention is to allow capture of all of the $CO_2$ produced by the combustion, i.e. a $CO_2$ capture efficiency of 100%.

The method according to the invention allows to carry to its storage site the $CO_2$ produced by an oxycombustion plant, whatever its purity and, in particular, its inert content, among which nitrogen, argon and oxygen.

The present invention can however provide other advantages in relation to the method described in document FR-2,872,566:
increase in the overall energy efficiency of the CO2 treating plant,
decrease in the total investment cost,
decrease in the operating costs,
decreased industrial and environmental risk.

BRIEF DESCRIPTION OF THE FIGURES

Other features and advantages of the invention will be clear from reading the description hereafter, with reference to the accompanying figures wherein.

DETAILED DESCRIPTION

Figure 1:
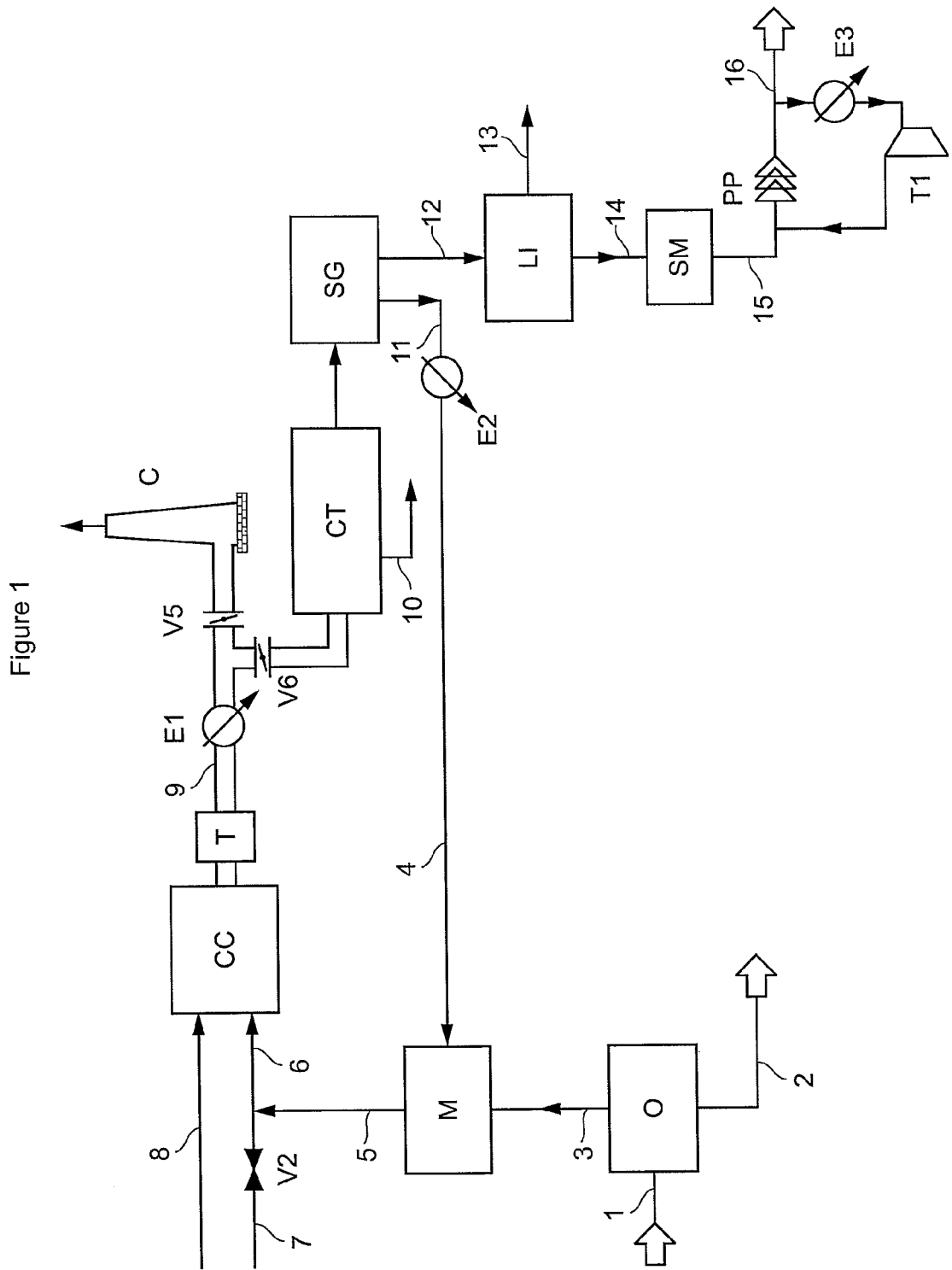
FIG. 1 diagrammatically shows a combustion plant with fumes capture.

The combustion plant shown in FIG. 1 can be used in various industries. For example, the combustion plant is a steam and electricity production plant, a refinery or a petrochemistry heater. The plant can be, for example, a steam reforming furnace, which allows to have a hydrogen production process with $CO_2$ capture and storage. The combustion plant can also be a cement plant kiln or an oxygen blast furnace used notably in the steel industry.

In FIG. 1, air is fed through line 1 into oxygen production unit O. Nitrogen is discharged from unit O through line 2 and it can be discharged into the atmosphere at a temperature close to ambient temperature. It is possible to achieve thermal integration of unit O with $CO_2$ liquefaction unit L1: the frigories recovered on the nitrogen discharge circuit can be used during partial liquefaction of the $CO_2$. Unit O generally produces 95 vol. % pure oxygen.

The oxygen produced by unit O is sent through line 3 into gas/gas mixer M to be mixed with the $CO_2$ flowing in through line 4. Thus, mixer M allows to reconstruct an oxidizer equivalent to air by dilution of the oxygen from unit O.

The mixture of oxygen and of $CO_2$ is discharged from mixer M through line 5.

Alternatively, oxygen production unit O and mixer M can be combined into a single device. This device can be a membrane separator wherein the oxygen is separated from the air through a membrane. The air circulates on one side of the membrane, the other side towards which the oxygen migrates being in contact with circulating gaseous $CO_2$. The oxygen is then directly incorporated in the $CO_2$ used as sweep gas.

Combustion chamber CC is supplied with oxidizer through line 6 and with fuel through line 8.

The fuel is a fuel of fossil origin. For example, it is possible to use natural gas, liquid fuel, coal, oil coke, or a mixture of these fossil fuels.

The flow rates of the fuel and of the oxidizer circulating in lines 6 and 8 are controlled and adjusted to carry out combustion with excess oxygen.

Under standard operating conditions of the combustion plant, valve V2 is shut and the oxidizer flowing in through line 6 is the mixture of oxygen and of $CO_2$ produced by mixer M. When valve V2 is opened, combustion chamber CC is supplied with air flowing in through line 7, which allows to return to a combustion under air in case of a problem with oxygen production unit O or with conditioning and transportation of the $CO_2$ to the underground storage site.

Combustion chamber CC consists of a metallic casing lined with a heat-resisting material. Furthermore, the combustion chamber comprises one or more burners, as well as tubes wherein the fluid to be heated circulates. This fluid can be boiler water that is converted to steam (case of a steam generator and/or of an electric generator), a mixture of hydrocarbons in the case of a refinery heater, a mixture of hydrocarbons and of steam in case of a steam reforming furnace.

The fumes produced by the combustion carried out in chamber CC can be subjected, in unit T, to dedusting and sulfur and/or nitrogen oxides removal treatments. For dedusting, electrostatic filters are preferably used. Some treatments can be carried out in combustion chamber CC. For example, if a high-sulfur fuel is used, injection of limestone into chamber CC allows a first reduction in the sulfur oxide content, generally followed by a second desulfurization stage applied to the fumes leaving the combustion chamber.

The fumes are then discharged through line 9 and extractor E1.

Then, the path followed by the fumes is determined by valves or dampers V5 and V6, i.e. means allowing to control the fumes flow rate in the lines.

When damper V6 is shut and damper V5 is open, the fumes are released into the atmosphere through chimney C. This method of operation is favoured when the combustion is carried out in air, notably during plant stoppage or starting stages, or in case of prolonged problems with oxygen production unit O or with the unit intended for treatment and transportation of the $CO_2$ to its storage site.

When damper V6 is open and damper V5 is shut, the fumes are fed into water condensation unit CT. Unit CT cools the fumes. The condensed water also carries along the sulfur compounds and the dusts that might not have been removed in treating unit T. The water and sulfur compound condensate is discharged through line 10 to a water and sulfur compound treating unit.

The desulfurized fumes freed of the condensed water are stored in drum SG.

Part of the fumes contained in tank SG is withdrawn through line 11 and extractor E2, then recycled through line 4 to mixer M, which allows an oxidizer to be reconstructed. Another part of the fumes contained in drum SG is fed through line 12 and partly liquefied in liquefaction unit L1. Under stabilized operating conditions, the flow rate of the $CO_2$ entering unit L1 corresponds to the flow rate of the $CO_2$ produced by the combustion. Partial liquefaction is carried out by means of a succession of compression and cooling stages.

Between two compression stages, the $CO_2$ has undergone cooling between the temperature reached at the end of the compression and a temperature close to the ambient temperature. Cooling can be achieved by heat exchange with air, water, or any other coolant. In particular, cooling can be carried out using the frigories obtained upon expansion of the nitrogen of line 2 produced by unit O. Upon liquefaction of the $CO_2$, the water collected during the successive cooling stages after each compression stage can be discharged through line 13.

Finally, the $CO_2$ is under high pressure (between 40 bars, possibly 50 bars and its critical point, preferably between 50 bars and 70 bars absolute) and at low temperature (above 0° C., preferably between 0° C. and 40° C., preferably 10° C.). Because of the presence of inerts, it is not possible to totally liquefy the gas phase. A purity of at least 95 vol. % $CO_2$ would be necessary to have only a liquid phase, whereas oxycombustion plants generally produce a $CO_2$ with a maximum purity of 90 vol. %. In this case, as illustrated in the numerical example hereafter, two phases are obtained after separation:

a gas phase containing practically all the inerts and part of the $CO_2$ (40 to 60 vol. %), a liquid phase containing the rest of the $CO_2$.

The $CO_2$ partly liquefied in unit L1 and the inerts are fed through line 14 into storage drum SM. The mixture in drum SM is at a pressure ranging between 40 bars and 70 bars and at a temperature above 0° C. According to the invention, unit L1 has to produce a stream in line 14 comprising at least 8 vol. % liquid in order to ensure smooth running of multiphase pump PP that requires a minimum amount of liquid at the inlet.

This mixture contained in storage drum SM can be intended for sequestration in an underground reservoir, for example in ancient oil or gas deposits, in sealed saline aquifers or in coal mines. It can also be injected into a depleted hydrocarbon, oil or gas, reservoir with a view to enhanced recovery. The mixture is discharged from drum SM through line 15, then transported after multiphase compression to the reservoir, for example by circulating through line 16.

In the present invention, the two-phase mixture obtained is compressed by means of at least one multiphase pump PP. Several pumps arranged in parallel or in series can also be used. Using a multiphase pump allows a two-phase mixture to be treated. This saves having to cool the fumes to a very low temperature (below 0° C.) prior to multiphase compression. This is advantageous as regards energy consumption and installation costs. Furthermore, all of the combustion fumes, i.e. the $CO_2$ and the inert compounds, can be treated without requiring a separation operation in order to release an inert-enriched fumes portion.

The multiphase pump(s) used are preferably multiphase pumps of helical-axial rotodynamic type considering the fumes pressure, temperature and volume flow rate conditions generally encountered in industrial oxycombustion plants, but other types of multiphase pumps can be used without departing from the scope of the invention, such as for example multiscrew positive-displacement multiphase pumps.

Multiphase pumps of helical-axial rotodynamic type consist of one or more compression stages fastened to a single shaft and whose geometry is suited for pumping mixtures of a gas phase and of at least one liquid phase. The geometry of such cells is notably described in document FR-2,665,224 or in document GB-2,287,288, this list being non limitative and mentioned here only by way of example of possible embodiments for the multiphase pump.

The multiphase pump can also consist of one or more multiphase stages followed by one or more non helical-axial stages, such as radial or semi-radial geometry stages commonly used in centrifugal pumps for single-phase liquids. Document FR-2,748,532 describes such a combination, which is particularly advantageous for the present method when the pressure has to be raised above the value where the mixture consists only of one or more liquid phases or of a single dense phase.

The $CO_2$ can be compressed to its pressure of injection into the underground reservoir where it will be trapped. In general, the injection pressure ranges between 80 and 300 bars, preferably between 100 and 120 bars. To know the pressure at the discharge end of the multiphase pump, the static heights and the pressure drops in the transport lines and in the wells must be taken into account as in the numerical example below.

Advantageously, a $CO_2$ recycle loop can be arranged around multiphase pump PP. Part of the $CO_2$ stream under pressure delivered by pump PP is cooled in heat exchanger E3, for example to a temperature ranging between 0° C. and 40° C. Preferably, the $CO_2$ stream part under pressure is cooled by heat exchange with an ambient fluid, air or water for example. This refrigerated stream is then expanded in expansion device T to a pressure close to the intake pressure of pump PP, ranging between 40 bars and 70 bars for example. The expanded stream is recycled to the pump inlet while being mixed with the partly liquefied $CO_2$ circulating in line 15.

Expansion device T1 can be an expansion valve or a two-phase expansion turbine. If a turbine is used, the expansion energy can be recovered to drive pump PP, for example by mounting turbine T1 and pump PP on the same shaft.

The $CO_2$ recycle loop around multiphase pump PP has, on the one hand, the advantage of protecting pump PP from operating instability due to an insufficient flow rate. On the other hand, by lowering the temperature of the stream at the inlet of pump PP, this loop allows to increase the liquid/gas proportion at the pump inlet, and the performances of pump PP are therefore improved.

Under standard or stabilized operating conditions, mixer M supplies chamber CC with a mixture of oxygen from unit O and of $CO_2$ from storage drum SG. Chamber CC is supplied with oxidizer from mixer M and with fuel flowing in through line 8. All of the combustion fumes are sent to the treating T and water condensation CT units, then fed into storage drum SG. Part of the $CO_2$ contained in drum SG is fed into mixer M. Another part of the $CO_2$ contained in drum SG is partly liquefied in liquefaction unit L1, then stored in drum SM, compressed in mixed phase and finally discharged through line 15 to be stored in an underground reservoir.

Figure 2:
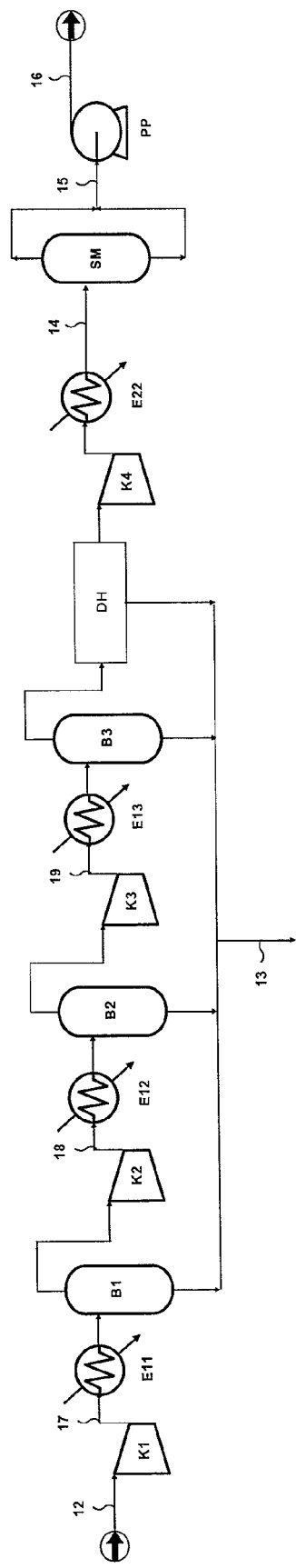
FIG. 2 shows in detail liquefaction of the fumes.

FIG. 2 shows in detail the stage of partial liquefaction of the combustion fumes. The reference numbers of FIG. 2 identical to the reference numbers of FIG. 1 designate the same elements.

Liquefaction of the fumes is carried out by means of several successive compressions in the various stages K1, K2, K3 and K4 of a compressor and by cooling in heat exchangers E11, E12, E13 and E14. After compression in one of the stages K1 to K3, the fumes are cooled by heat exchange, generally with water, in E1 to E3 so as to reach a temperature below 50° C., generally about 40° C. Cooling causes condensation of the water that is collected at the bottom of drums B1 to B3. The gas at the top of B1 to B3 is sent to the next compression stage.

The fumes discharged at the top of drum B3 can be subjected to a dehydration treatment in unit DH. For example, DH uses a glycol treatment.

The water streams collected at the bottom of drums B1 to B3 and possibly from DH are discharged through line 13.

The fumes discharged at the top of drum B3 and possibly treated in DH are compressed by compression stage K4, then sent through line 14 to drum SM.

According to the invention, the compression ratio of K1 to K4 and the cooling temperature of E22 are determined so as to obtain in line 14 a partly liquefied stream comprising at least 8% liquid. Furthermore, in order to save using energy-costly refrigeration cycles, the fumes are cooled by heat exchange in E11, E12, E13 and E22 with an ambient fluid, water or air for example, to a temperature above 0° C., preferably ranging between 0° C. and 40° C.

The present invention thus allows capture and sequestration of all of the $CO_2$ from combustion chamber CC.

The combustion plant according to the invention can be implemented using a combustion chamber and an already existing chimney. This operation, commonly referred to as revamping, allows to reuse existing plants that are investment-costly in a $CO_2$ capture context. This type of operation is possible with the method according to the invention because it does not require pressurizing combustion chamber CC.

The various advantages of the present invention will be clear from reading the numerical example hereafter presenting the application of the layout described in connection with FIG. 1, with a liquefaction unit as shown in FIG. 2.

In the application example, we consider the case of a 450-MW net oxy-boiler producing 470 tons/hour $CO_2$ mixed with impurities and inert gases in the following mass proportions:

| | |
|---|---|
| Carbon dioxide $CO_2$: | 91.13% |
| Water $H_2O$: | 1.33% |
| Nitrogen $N_2$: | 1.84% |
| Oxygen $O_2$: | 2.20% |
| Argon Ar: | 3.34% |
| others, including $SO_2$: | 0.16%. |

The gas is compressed up to 50 bars through four compression stages K1 to K4, with intermediate cooling in E11 to E13 to ambient temperature, preferably between 0° C. and 40° C.

The table below gives the thermodynamic conditions of the gas upon compression:

|           | Reference |     |     |      |      |
| --------- | --------- | --- | --- | ---- | ---- |
|           | 12        | 17  | 18  | 19   | 14   |
| Pressure (kPa) | 101  | 350 | 970 | 2700 | 5000 |
| Temperature (° C.) | 25 | 145 | 145 | 145 | 6 |

The table hereafter gives the powers required by the various compression stages K1 to K4:

|            | Reference |      |      |    |
| ---------- | --------- | ---- | ---- | -- |
|            | K1        | K2   | K3   | K4 |
| Power (MW) | 15.5      | 13.4 | 12.8 | 6  |

At the outlet of K4, the gaseous mixture is partly liquefied by cooling to 6° C. so as to obtain 9.8 vol. % liquid.

In this example, the multiphase pump is designed to raise the pressure of the mixture from 50 bars to 100 bars. Preferably, the water $H_2O$ phase is removed from the mixture prior to compression, by means of a dehydration unit DH upstream from the multiphase pump.

A single helical-axial type multiphase pump can be suitable to obtain this pressure increase with the total output considered. This pump consists of 10 compression stages mounted in series on a single shaft and comprising a rotating part secured to the shaft in rotation, referred to as rotor, and a stationary part referred to as stator, which regulates the flow. For this application, the pump predimensioning calculations lead to an outside diameter of the rotor of 460 mm and to a rotating speed of the rotor of 3600 rpm. The multiphase pump is made up of two series of compression cells, a first series of 4 successive cells preceding a second series of 6 cells. The geometry of each compression cell is identical within the same series. Selection of two distinct series of cells in the pump is intended to adjust the geometry of the compression cells to the characteristics of the flow through the pump in order to optimize the hydraulic performances of the machine for the application considered. In this pump, it is not necessary to use a cell of different geometry for each compression stage as in axial compressors or turbines.

The driving power required on the shaft of this pump is approximately 5100 KW.

For this example, the evolution of the thermodynamic characteristics of the mixture compressed through this pump is shown in the table below:

This example shows that compression in the mixed phase allows to obtain the desired injection pressure level (100 bars here) for the total flow rate of the combustion residues of a 450-MW oxy-boiler, i.e. approximately 516 tons/hour. This flow rate can be treated using a single 10-stage multiphase pump, which requires a driving power that is less than or equal to the power usually consumed by an equivalent $CO_2$ liquefaction treatment, gas/liquid separation and pumping unit.

By treating all of the $CO_2$ and inerts stream, the method according to the invention also allows to do without a gas/liquid separation equipment.

The invention claimed is:

1. A combustion method with carbon dioxide capture wherein at least the following stages are carried out:
    a) mixing an oxygen-rich stream with a carbon dioxide-rich stream so as to form a mixture,
    b) burning a fuel with said mixture,
    c) treating the combustion fumes to condense water and carry along with it sulfur compounds, wherein part of the treated fumes is used to be mixed with the oxygen-rich stream in stage a)
    d) partly liquefying at least part of the treated fumes obtained in stage c), by compression to a pressure ranging between 40 and 70 bars absolute and by cooling to a temperature above 0° C., so as to obtain partly liquefied fumes containing at least 8% by volume of liquid, and
    e) compressing by means of at least one multiphase pump the partly liquefied fumes obtained in stage d) so as to obtain a compressed stream.

2. A method as claimed in claim 1, wherein, in stage d), partial liquefaction of the treated fumes is achieved by means of at least one fumes compression to a pressure ranging between 50 and 70 bars and by cooling of the compressed fumes to a temperature ranging between 0° C. and 40° C.

3. A method as claimed in claim 1, wherein the compressed fumes are injected into an underground reservoir.

4. A method as claimed in claim 3, wherein the compressed fumes obtained in stage e) are transported to, then injected and sequestered in an underground reservoir.

5. A method as claimed in claim 3, wherein the compressed fumes obtained in stage e) are transported to, then injected into an underground hydrocarbon reservoir in order to improve hydrocarbon recovery.

6. A combustion method with carbon dioxide capture wherein at least the following stages are carried out:
    a) mixing an oxygen-rich stream with a carbon dioxide-rich stream so as to form a mixture,
    b) burning a fuel with said mixture,

|                          | Unit    | Pump inlet | Inlet stage 3 | Inlet stage 5 | Inlet stage 7 | Inlet stage 9 | Pump outlet |
| ------------------------ | ------- | ---------- | ------------- | ------------- | ------------- | ------------- | ----------- |
| Pressure                 | bar a.  | 50.0       | 56.7          | 64.4          | 73.9          | 86.2          | 100.6       |
| Temperature              | ° C.    | 6.0        | 10.9          | 16.0          | 21.7          | 30.7          | 41.7        |
| Gas flow rate            | m³/h    | 2282       | 1986          | 1729          | 1538          | 1567          | 1503        |
| Gas density              | kg/m³   | 144        | 172           | 210           | 271           | 325           | 339         |
| Liquid flow rate         | m³/h    | 200        | 192           | 172           | 115           | 6.8           | 6.8         |
| Liquid density           | kg/m³   | 932        | 909           | 886           | 862           | 995           | 991         |
| Gas + liquid total flow rate | m³/h | 2483     | 2178          | 1901          | 1653          | 1574          | 1510        |
| Average density          | kg/m³   | 208        | 237           | 271           | 312           | 328           | 342         |
| Gas volume fraction      |         | 0.919      | 0.912         | 0.910         | 0.931         | 0.996         | 0.995       |
| Gas/liquid volume ratio  | m³/m³   | 11.4       | 10.4          | 10.1          | 13.4          | NS            | NS          |

NS: not significant, the dense phase domain being reached.

c) treating the combustion fumes to condense water and carry along sulfur compounds, d) partly liquefying at least part of the treated fumes obtained in stage c), by compression to a pressure ranging between 40 and 70 bars absolute and by cooling to a temperature above 0° C., so as to obtain partly liquefied fumes containing at least 8% by volume of liquid, and e) compressing by means of at least one multiphase pump the partly liquefied fumes obtained in stage d) so as to obtain a compressed stream, f) expanding part of the compressed stream obtained in stage e), then g) recycling said stream part by adding said expanded stream part to the partly liquefied fumes obtained in stage c), prior to compression by means of the multiphase pump.

7. A method as claimed in claim 6, wherein said compressed stream part is cooled by heat exchange prior to expansion.

8. A method as claimed in claim 6, wherein, in stage d), partial liquefaction of the treated fumes is achieved by means of at least one fumes compression to a pressure ranging between 50 and 70 bars and by cooling of the compressed fumes to a temperature ranging between 0° C. and 40° C.

9. A method as claimed in claim 7, wherein, in stage d), partial liquefaction of the treated fumes is achieved by means of at least one fumes compression to a pressure ranging between 50 and 70 bars and by cooling of the compressed fumes to a temperature ranging between 0° C. and 40° C.

10. A method as claimed in claim 6, wherein the compressed fumes are injected into an underground reservoir.

11. A method as claimed in claim 7, wherein the compressed fumes are injected into an underground reservoir.

12. A combustion method with carbon dioxide capture wherein at least the following stages are carried out:
    a) mixing an oxygen-rich stream with a carbon dioxide-rich stream so as to form a mixture,
    b) burning a fuel with said mixture,
    c) treating the combustion fumes to condense water and carry along sulfur compounds,
    d) partly liquefying at least part of the treated fumes obtained in stage c), by compression to a pressure ranging between 40 and 70 bars absolute and by cooling to a temperature above 0° C., so as to obtain partly liquefied fumes containing at least 8% by volume of liquid, and
    e) compressing by means of at least one multiphase pump the partly liquefied fumes obtained in stage d) so as to obtain a compressed stream, wherein the multiphase pump is a helical-axial rotodynamic pump comprising at least one compression cell mounted on a single shaft and whose geometry is suited for pumping mixtures of a gas phase and of at least one liquid phase.

13. A method as claimed in claim 12, wherein, in stage d), partial liquefaction of the treated fumes is achieved by means of at least one fumes compression to a pressure ranging between 50 and 70 bars and by cooling of the compressed fumes to a temperature ranging between 0° C. and 40° C.

14. A method as claimed in claim 12, wherein the compressed fumes are injected into an underground reservoir.

15. A combustion method with carbon dioxide capture wherein at least the following stages are carried out:
    a) mixing an oxygen-rich stream with a carbon dioxide-rich stream so as to form a mixture,
    b) burning a fuel with said mixture,
    c) treating the combustion fumes to condense water and carry along sulfur compounds,
    d) partly liquefying at least part of the treated fumes obtained in stage c), by compression to a pressure ranging between 40 and 70 bars absolute and by cooling to a temperature above 0° C., so as to obtain partly liquefied fumes containing at least 8% by volume of liquid, and
    e) compressing by means of at least one multiphase pump the partly liquefied fumes obtained in stage d) so as to obtain a compressed stream, wherein the multiphase pump comprises at least one compression cell suited for pumping mixtures of a gas phase and of at least one liquid phase, associated with at least one compression cell conventionally used for pumping or compression of fluids made up of a single phase.

16. A method as claimed in claim 15, wherein, in stage d), partial liquefaction of the treated fumes is achieved by means of at least one fumes compression to a pressure ranging between 50 and 70 bars and by cooling of the compressed fumes to a temperature ranging between 0° C. and 40° C.

17. A method as claimed in claim 15, wherein the compressed fumes are injected into an underground reservoir.

* * * * *